United States Patent
Schwab et al.

(10) Patent No.: US 11,161,493 B2
(45) Date of Patent: Nov. 2, 2021

(54) COMMUNICATIONS SYSTEM FOR A HYDRAULIC BRAKE SYSTEM

(71) Applicant: Robert Bosch GmbH, Stuttgart (DE)

(72) Inventors: Michael Schwab, Korntal-Muenchingen (DE); Joachim Graf, Gueglingen (DE); Juergen Landsgesell, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 16/620,392

(22) PCT Filed: Mar. 28, 2018

(86) PCT No.: PCT/EP2018/057878
§ 371 (c)(1),
(2) Date: Dec. 6, 2019

(87) PCT Pub. No.: WO2018/224197
PCT Pub. Date: Dec. 13, 2018

(65) Prior Publication Data
US 2020/0086842 A1    Mar. 19, 2020

(30) Foreign Application Priority Data
Jun. 9, 2017    (DE) .......................... 102017209738.8

(51) Int. Cl.
*B60T 13/66*    (2006.01)
*B60T 8/17*    (2006.01)
(Continued)

(52) U.S. Cl.
CPC .............. *B60T 13/662* (2013.01); *B60T 8/17* (2013.01); *B60T 8/885* (2013.01); *B60T 13/165* (2013.01);
(Continued)

(58) Field of Classification Search
CPC .......... B60T 13/662; B60T 8/885; B60T 8/17; B60T 2270/413; B60T 13/165; B60T 13/58; B60T 2270/402; B60T 17/221
See application file for complete search history.

(56) References Cited

U.S. PATENT DOCUMENTS

2015/0217790 A1    8/2015    Golden et al.
2016/0023644 A1    1/2016    Feigel et al.
(Continued)

FOREIGN PATENT DOCUMENTS

CN    1722030 A    1/2006
DE    102015204757 A1    9/2016
(Continued)

OTHER PUBLICATIONS

International Search Report for PCT/EP2018/057878, dated Jul. 5, 2018.

*Primary Examiner* — Pamela Rodriguez
(74) *Attorney, Agent, or Firm* — Norton Rose Fulbright LLP; Gerard Messina (57) ABSTRACT

A communications system is described for a hydraulic brake system, including a communications bus, a connected, first control device, a connected, second control device, and a further connected communications unit. In response to a loss of its communication with the first control device in spite of its regular communication with the at least one further communications unit, at least one instance of functional impairment of the first control device and/or of a first motorized device controlled by the first control device is detectable with the aid of the second control device. A hydraulic brake system for a vehicle, a method for checking a communications system, and a method for operating a hydraulic brake system of a vehicle, are also described.

17 Claims, 2 Drawing Sheets

(51) Int. Cl.
   *B60T 8/88*    (2006.01)
   *B60T 13/16*   (2006.01)
   *B60T 13/58*   (2006.01)
   *B60T 17/22*   (2006.01)

(52) U.S. Cl.
   CPC ............ *B60T 13/58* (2013.01); *B60T 17/221* (2013.01); *B60T 2270/402* (2013.01); *B60T 2270/413* (2013.01)

(56) References Cited

U.S. PATENT DOCUMENTS

| | | |
|---|---|---|
| 2017/0158182 A1 | 6/2017 | Foitzik et al. |
| 2020/0070788 A1* | 3/2020 | Michels .................. F16D 65/14 |

FOREIGN PATENT DOCUMENTS

| | | |
|---|---|---|
| EP | 1672505 A2 | 6/2006 |
| EP | 2705994 A1 | 3/2014 |
| JP | 2009227103 A | 10/2009 |

\* cited by examiner

COMMUNICATIONS SYSTEM FOR A HYDRAULIC BRAKE SYSTEM

FIELD

The present invention relates to a communications system for a hydraulic brake system, as well as to a hydraulic brake system for a vehicle. The present invention also relates to a method for checking a communications system. Furthermore, the present invention relates to a method for operating a hydraulic brake system of a vehicle.

BACKGROUND INFORMATION

A communications system of a brake system, made up of a control device used for controlling a brake booster and a control unit used for controlling a hydraulic system, is described in German Patent Application No. DE 10 2015 204 757 A1. The control device is connected to the control unit via a signal transmission device in such a manner, that bidirectional/bilateral communication between the control device and the control unit is possible. As soon as the control device recognizes that at least one instance of functional impairment of the control unit, the hydraulic system and/or the signal transmission device is present, the control device is configured to autonomously activate the brake booster in such a manner, that brake pressure may be built up by the brake booster in at least one wheel brake cylinder of the brake system.

SUMMARY

The present invention provides a communications system for a hydraulic brake system, a hydraulic brake system for a motor vehicle, a method for checking a communications system, and a method for operating a hydraulic brake system of a vehicle.

The present invention provides options for checking a communications system and for differentiating between a first fault condition, "at least one instance of functional impairment (possibly, a functional failure) of the first control device and/or of the first motorized device, while the communications bus is operational," and a second fault condition, "at least one instance of functional impairment (possibly, a functional failure) of the communications bus." This eliminates the conventional necessity of already reacting to an instance of functional impairment/a functional failure of only the communications bus, as if the first control device connected to the communications bus and/or the first motorized device had (also) stopped functioning. Consequently, use of the present invention allows, in each instance, a more selective reaction to the fault condition currently present. The more selective reaction may allow the current fault condition to be responded to in an improved manner.

In one advantageous specific embodiment of the communications system in accordance with the present invention, the first control device in the first operating mode is configured for regular communication with the at least one further communications unit, in such a manner, that with the aid of the first control device, in response to a loss of its communication with the second control device in spite of its regular communication with the at least one further communications unit, at least one instance of functional impairment of the second control device and/or of the second motorized device is detectable. Thus, in this specific embodiment of the communications system, it is also possible to differentiate between a functional failure of the second control device and/or of the second motorized device and a functional failure of the communications bus.

In one further advantageous specific embodiment of the communications system in accordance with the present invention, in response to a loss of its communication with the first control device in spite of its regular communication with the at least one further communications unit, the second control device is configured to execute a predetermined bypass program. Consequently, an instance of functional impairment (and/or a functional failure) of the first control device and/or of the first motorized device may be overcome. Alternatively or additionally, in response to a loss of its communication with the second control device in spite of its ongoing communication with the at least one further communications unit, the first control device may also be configured to execute a further, predetermined bypass program. Therefore, an instance of functional impairment (and/or a functional failure) of the second control device and/or of the second motorized device may also be overcome with the aid of the bypass program of the first control device (and of the controlled, first motorized device).

The present invention also provides an example hydraulic brake system for a vehicle, including: such a communications system; an electromechanical brake booster, which is controllable by the first control device as a first motorized device, in such a manner, that with the aid of the controlled, electromechanical brake booster, brake fluid may be transferred from a master brake cylinder of the hydraulic brake system, situated downstream from the electromechanical brake booster, into at least one wheel brake cylinder of the hydraulic brake system; and a motorized hydraulic device, which is controllable by the second control device as the second motorized device, in such a manner, that brake fluid may be transferred into the at least one wheel brake cylinder with the aid of the motorized hydraulic device. Since in such a brake system (in contrast to the related art described above), it is possible to differentiate at least between the first fault condition, "at least one instance of functional impairment (possibly, a functional failure) of the first control device and/or of the first motorized device, while the communications bus is operational," and the second fault condition, "at least one instance of functional impairment (possibly, a functional failure) of the communications bus," in each instance, the fault situation present may also be responded to in a more selective manner. In the related art described above, a functional failure of the communications bus already initiates the autonomous activation of the brake booster, although it has not yet been clearly discerned, that autonomous buildup of brake pressure in the at least one wheel brake cylinder by the activated brake booster is necessary. This disadvantage is eliminated in the hydraulic brake system described here.

For example, the hydraulic brake system may be designed such that as long as at least the first control device and the electromechanical brake booster are operational, the first control device is configured to control the electromechanical brake booster in view of a provided setpoint brake pressure buildup signal regarding an instance of autonomous braking requested by an automatic speed control system of the vehicle, an instance of externally powered braking requested by a driver of the vehicle, or braking force assistance requested by the driver, in such a manner, that with the aid of the controlled electromechanical brake booster, a volume of brake fluid corresponding to the setpoint brake pressure buildup signal is transferable from the master brake cylinder into the at least one wheel brake cylinder; the second control device being configured to control the motorized hydraulic device as a bypass program, in such a manner, that with the aid of the controlled, motorized hydraulic device, the volume of brake fluid corresponding to the setpoint brake pressure buildup signal is transferable into the at least one wheel brake cylinder. Thus, only if a functional failure of the first control device and/or of the electromechanical brake booster is reliably detected, is the motorized hydraulic device selectively deployed for overcoming the functional failure.

Alternatively, the hydraulic brake system may also be designed such that as long as at least the second control device and the motorized hydraulic device are operational, the second control device is configured to control the motorized hydraulic device in view of a provided setpoint brake pressure build-up signal regarding an instance of autonomous braking requested by an automatic speed control system of the vehicle, an instance of externally powered braking requested by a driver of the vehicle, or braking force assistance requested by the driver, in such a manner, that with the aid of the controlled, motorized hydraulic device, a volume of brake fluid corresponding to the setpoint brake pressure buildup signal is transferable into the at least one wheel brake cylinder; the first control device being configured to control the electromechanical brake booster as a bypass program, in such a manner, that with the aid of the controlled electromechanical brake booster, the volume of brake fluid corresponding to the setpoint brake pressure buildup signal is transferable from the master brake cylinder into the at least one wheel brake cylinder. Therefore, in this specific embodiment of the hydraulic brake system, as well, it is ensured that only when a functional failure of the second control device and/or of the motorized hydraulic device is reliably detected, is the electromechanical brake booster used for overcoming the functional failure.

The advantages already described above are also brought about by executing a corresponding example method for checking a communications system. It should be pointed out that the method for checking a communications system may be refined further in accordance with the specific embodiments of the communications system described above.

In addition, executing a corresponding example method for operating a hydraulic brake system of a vehicle also produces the advantages already described above. Furthermore, the method for operating a hydraulic brake system of a vehicle may be refined further in accordance with the above-described specific embodiments of the communications system and/or of the hydraulic brake system.

BRIEF DESCRIPTION OF THE DRAWINGS

Additional features and advantages of the present invention are explained below in light of the figures.

DETAILED DESCRIPTION OF EXAMPLE EMBODIMENTS

Figure 1:
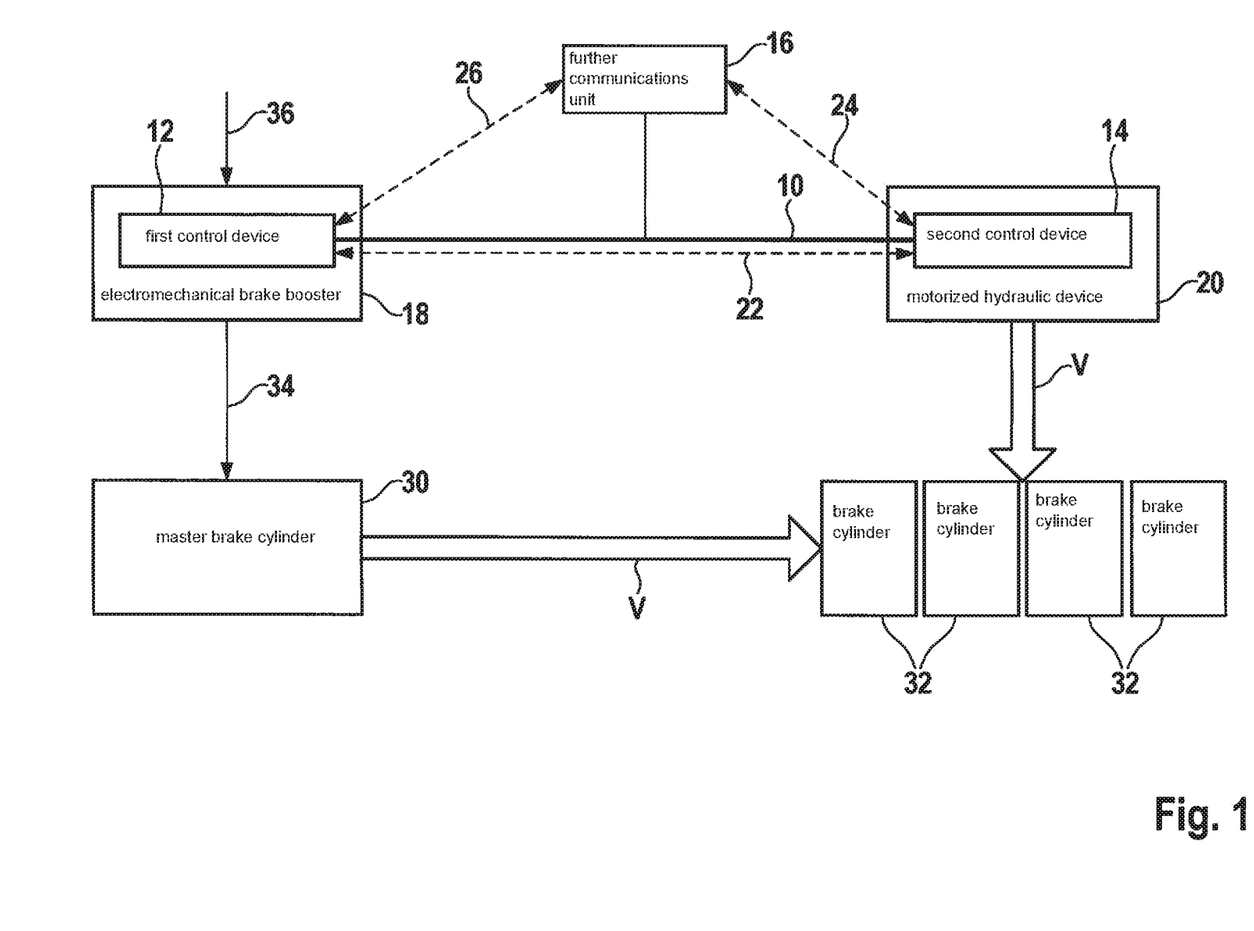
FIG. 1 shows a schematic representation of a specific embodiment of the communications system and/or of the hydraulic brake system equipped with it.

FIG. 1 shows a schematic representation of a specific embodiment of the communications system, that is, of the hydraulic brake system equipped with it.

The communications system represented schematically in FIG. 1 includes a communications bus 10, a first control device 12 connected to communications bus 10, and a second control device 14 connected to communications bus 10. An ability to develop communications bus 10 is not limited to a particular bus topology. For example, a bus topology of communications bus 10 may be star-shaped or linear.

At least one (further) communications unit 16 is also situated on/connected to communications bus 10. It is emphasized that neither first control device 12, nor second control device 14 falls under the at least one further communications unit 16. However, the at least one communications unit may be understood, in each instance, as a unit made up of a plurality of different communications subscribers. An ability to develop the at least one communications unit is not limited to a particular type, such as a communications node.

First control device 12 may be a subunit of a first motorized device 18 controlled with the aid of first control device 12. As an alternative, however, first control device 12 may also be positionable/positioned separately from the first motorized device 18 controlled with the aid of first control device 12. As long as first control device 12 and/or the first motorized device 18 controlled with the aid of first control device 12 are operational, first control device 12 is in a first operating mode (e.g., fully functional operating mode).

Second control device 14 may also be a subunit of a second motorized device 20 controlled with the aid of second control device 14. However, a form of second control device 14 is also possible, in which second control device 14 (as an independent component) is positionable/positioned separately from the second motorized device 20 controlled with the aid of second control device 14. As long as second control device 14 and/or the second motorized device 20 controlled with the aid of second control device 14 are operational, second control device 14 is also in a second operating mode (e.g., fully functional operating mode).

The first control device 12 in the first operating mode and the second control device 14 in the second operating mode are configured for regular communication 22 with each other. In other words, the first control device 12 in the first operating mode and the second control device 14 in the second operating mode carry on regular communication 22 with each other. The regular communication 22 of the at least one further communications unit 16, situated on communications bus 10, of the first control device 12 in the first operating mode, with the second control device 14 in the second operating mode, may be understood as the transmitting and receiving (that is, exchanging) of indicating signals and/or reply signals. For example, the first control device 12 in the first operating mode and the second control device 14 in the second operating mode may transmit indicating signals regularly to each other (in particular, at a predefined repetition frequency).

Alternatively, one of the two control devices 12 and 14 may also be configured to transmit interrogation signals regularly (in particular, at a predefined interrogation frequency) to the other of the two control devices 12 and 14; the other of the two control devices responding to the interrogation signals by transmitting reply signals immediately. Consequently, one may also speak of a cyclical communication 22 or permanent communication 22 between the first control device 12 in the first operating mode and the second control device 14 in the second operating mode.

In addition, the second control device 14 in the second operating mode is designed for regular communication 24 with the at least one further communications unit 16 situated on communications bus 10. Therefore, the second control device 14 in the second operating mode and the at least one communications unit 16 have regular communication 24 with each other. The regular communication 24 of the second control device 14 in the second operating mode with the at least one further communications unit 16 may also be understood as the transmitting and receiving (that is, exchanging) of indicating signals and/or reply signals. For example, the second control device 14 in the second operating mode and the at least one communications unit 16 may transmit indicating signals regularly to each other (in particular, at a predetermined repetition frequency). Alternatively, the second control device 14 in the second operating mode or the at least one communications unit 16 may be configured to transmit interrogation signals regularly (in particular, at a predetermined interrogation frequency) to the other communications subscriber 14 or 16; the other communications subscriber 14 or 16 reacting to the interrogation signals by sending reply signals immediately. Consequently, one may also speak of cyclical communication 24 or permanent communication 24 between the second control device 14 in the second operating mode and the at least one further communications unit 16.

Due to the advantageous design of components 12, 14 and 16, in response to a loss of its communication 22 with first control device 12 in spite of its regular communication 24 with the at least one further communications unit 16, at least one instance of functional impairment of first control device 12 and/or of first motorized device 18 is, as such, reliably and correctly detectable with the aid of second control device 14. Provided that a loss of its communication 22 with first control device 12 in spite of its regular/uninterrupted communication 24 is detected with the aid of second control device 14, present operability of communications bus 10 may be reliably assumed. (Otherwise, communication 24 of the second control device 14 in the second operating mode with the at least one further communications unit 16 would be lost, as well.) Consequently, the loss of communication 22 in spite of the regular/uninterrupted communication 24 may be reliably attributed to at least one instance of functional impairment (possibly, a functional failure) of first control device 12 and/or of first motorized device 18.

While the above-described related art is only able to detect at least one instance of functional impairment of a control device/control unit, of a device controlled by it, and/or of a signal transmission device (using bidirectional/bilateral communication), the communications system described here is also configured to differentiate between a first fault condition, "at least one instance of functional impairment (possibly, a functional failure) of first control device 12 and/or of first motorized device 18, with an operational communications bus 10," and a second fault condition, "at least one instance of functional impairment (possibly, a functional failure) of communications bus 10." (By use of the at least one further communications unit 16,) The communications system allows improved communications monitoring and clearer recognition of a fault condition currently present, which means that the fault condition currently present may also be reacted to more selectively.

In particular, in response to a loss of its communication 22 with first control device 12 in spite of its regular communication 24 with the at least one further communications unit 16, second control device 14 may be configured to execute a predetermined bypass program, that is, to compensate for/overcome the functional impairment/functional failure of first control device 12 and/or of first motorized device 18, by adapting the operation of the second motorized device 20 controlled by second control device 14. (This is explained below in even more detail with the aid of an example.)

In the form of a further refinement, the first control device 12 in the first operating mode may also be configured for regular communication 26 with the at least one further communications unit 16 in such a manner, that with the aid of first control device 12, in response to a loss of its communication 22 with second control device 14 in spite of its regular communication 26 with the at least one further communications unit 16, at least one instance of functional impairment of second control device 14 and/or of second motorized device 20 is detectable. The regular communication 26 of the first control device 12 in the first operating mode with the at least one further communications unit 16 may include the above-mentioned features of the communication 24 of the second control device 14 in the second operating mode with the at least one further communications unit 16.

If a loss of its communication 22 with second control device 14 in spite of its regular communication 26 with the at least one further communications unit 16 is detected by first control device 14, it may also be reliably assumed that communications bus 10 is presently operational. Consequently, the loss of communication 22 in spite of regular communication 26 may be reliably attributed to at least one instance of functional impairment (possibly, a functional failure) of second control device 14 and/or of second motorized device 20. Thus, the communications system described here is also configured to differentiate between the second fault condition, "at least one instance of functional impairment (possibly, a functional failure) of communication bus 10," and a third fault condition, "at least one instance of functional impairment (possibly, a functional failure) of second control device 14 and/or second motorized device 20, while communications bus 10 is presently operational."

In response to a loss of its communication 22 with second control device 14 in spite of its regular communication 26 with the at least one further communications unit 16, first control device 12 may also be configured to execute a (further) predetermined bypass program, that is, to compensate for/overcome the functional impairment/functional failure of second control device 14 and/or of second motorized device 20, by adapting the operation of the first motorized device 18 controlled by first control device 12.

It should be pointed out that the hardware schematically represented in FIG. 1 is, generally, already installed in a conventional communications system. Thus, in order to develop the communications system according to FIG. 1, it is often sufficient to redesign/reprogram the operation of components 12, 14 and 16.

In the example of FIG. 1, the communications system is part of a hydraulic brake system of a vehicle/motor vehicle. An ability to use the communications system is not limited to either a particular type of hydraulic brake system, or a particular type of vehicle/motor vehicle. An electromechanical brake booster 18 of the hydraulic brake system is (as a first motorized device 10) controllable by first control device 12 in such a manner, that brake fluid may be/is transferred by controlled electromechanical brake booster 18, from a master brake cylinder 30 of the hydraulic brake system, situated downstream from electromechanical brake booster 18, into at least one wheel brake cylinder 32 of the hydraulic brake system. With the aid of controlled electromechanical brake booster 18, for example, a booster force 34 may be applied to at least one movable piston of master brake cylinder 30 in such a manner, that brake fluid may be pressed into the at least one hydraulically connected wheel brake cylinder 32, by moving the at least one piston into master brake cylinder 30.

The brake system schematically represented with the aid of FIG. 1 also includes a motorized hydraulic device 20 (as second motorized device 20), which is controllable by second control device 14 in such a manner, that with the aid of motorized hydraulic device 20, brake fluid may be/is transferred into the at least one wheel brake cylinder 32. Motorized hydraulic device 20 may be, for example, a pump system including at least one hydraulic pump, which may be driven by at least one pump motor in such a manner, that brake fluid may be/is pumped into the at least one wheel brake cylinder 32. Alternatively, or in addition, motorized hydraulic device 20 may also include a motorized piston-cylinder device (plunger device), with the aid of which brake fluid may be/is pressed into the at least one connected wheel brake cylinder 32.

The hydraulic brake system of FIG. 1 is designed such that, (at least) as long as first control device 12 and electromechanical brake booster 18 are operational, first control device 12 is configured to control electromechanical brake booster 18 in view of a provided setpoint brake pressure buildup signal 36, in such a manner, that with the aid of controlled electromechanical brake booster 18 (in place of motorized hydraulic device 20), a volume V of brake fluid corresponding to the setpoint brake pressure buildup signal may be/is transferred by controlled electromechanical brake booster 18 from master brake cylinder 30 into the at least one wheel brake cylinder 32. Thus, as long as first control device 12, second control device 14, electromechanical brake booster 18, and motorized hydraulic device 20 are operational, first control device 12 has a master status; (with the aid of the electromechanical brake booster 18 controlled by first control device 12, a brake pressure requested via setpoint brake pressure buildup signal 36 being able to be produced in the at least one wheel brake cylinder 32); while second control device 14 has a slave status. (Motorized hydraulic device 20 preferably remains deactivated, while second control device 14 has the slave status.)

However, (in response to a loss of its communication 22 with second control device 14 in spite of its regular communication 26 with the at least one further communications unit 16), second control device 14 is configured to control motorized hydraulic device 20 as a bypass program in such a manner, that with the aid of controlled, motorized hydraulic device 20 (in place of electromechanical brake booster 18), the volume V of brake fluid corresponding to setpoint brake pressure buildup signal 36 may be/is transferred into the at least one wheel brake cylinder 32. In other words, in response to a loss of its communication 22 with second control device 14 in spite of its regular communication 26 with the at least one further communications unit 16, second control device 14 may be switched from the slave status to a master status. Since with the aid of the communications system (in contrast to the related art described above), it is possible to reliably differentiate between the first fault condition, "at least one instance of functional impairment (possibly, a functional failure) of first control device 12 and/or of first motorized device 18, while communications bus 10 is presently operational," and the second fault condition, "at least one instance of functional impairment (possibly, a functional failure) of communications bus 10," there is, in response to the presence of the second fault condition, no risk of second control device's 14 being switched from the slave status to the master status and decelerating the vehicle excessively with the aid of its bypass program executed during the master status. Therefore, second control device 14 may be configured, without risk, to produce, without restriction, the brake pressure requested via setpoint brake pressure buildup signal 36 in the at least one wheel brake cylinder 32, using controlled, motorized hydraulic device 20, after it is switched to master status. (In the related art, in order to prevent "excessive braking of the vehicle" while bypassing the control unit with the aid of the control device, the control device is often only configured to partially compensate for the control unit that is actually or supposedly nonfunctional.) Thus, with the aid of the hydraulic brake system of FIG. 1, both maximum vehicle deceleration and effective vehicle stabilization may also be achieved in the case of a fault.

For example, setpoint brake pressure buildup signal 36 may be understood as a signal, which is outputted by an automatic speed control system of a vehicle equipped with the hydraulic brake system, and by which the automatic speed control system requests autonomous braking of the vehicle. Consequently, the brake system of FIG. 1 may be used reliably for autonomously decelerating (and/or autonomously controlling/regulating a speed of) the vehicle. Alternatively, or in addition, however, setpoint brake pressure buildup signal 36 may also represent externally powered braking requested by a driver of the vehicle. Setpoint brake pressure buildup signal 36 may also indicate braking force assistance requested by the driver. In both cases, setpoint brake pressure buildup signal 36 may be outputted by a brake actuation sensor, in order to ascertain an instance of manipulation of a brake actuating element/brake pedal by the driver. Such a brake actuation sensor may be, for example, a brake pedal sensor, a rod travel sensor, and/or a differential travel sensor.

In one alternative specific embodiment, (at least) as long as second control device 14 and motorized hydraulic device 20 are operational, second control device 14 may be configured to control motorized hydraulic device 20 in such a manner, that with the aid of controlled, motorized hydraulic device 20, the volume V of brake fluid corresponding to setpoint brake pressure buildup signal 36 may be transferred into the at least one wheel brake cylinder 32; first control device 12 controlling electromechanical brake booster 18 as a (further) bypass program, in such a manner, that with the aid of controlled electromechanical brake booster 18, a volume V of brake fluid corresponding to setpoint brake pressure buildup signal 36 may be/is transferred from master brake cylinder 30 into the at least one wheel brake cylinder 32. Consequently, this specific embodiment also produces the advantages explained above.

Figure 2:
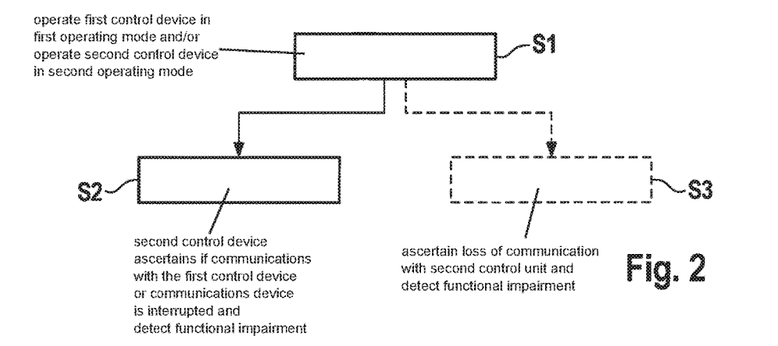
FIG. 2 shows a flow chart for explaining a specific embodiment of the method for checking a communications system.

FIG. 2 shows a flow chart for explaining a specific embodiment of the method for checking a communications system.

In a method step S1, if a first control device connected to a communications bus of the communications system and/or a first motorized device controlled with the aid of the first control device are operational, the first control device is operated in a first operating mode. At the same time, if a second control device connected to the communications bus and/or a second motorized device controlled with the aid of the second control device are operational, the second control device is operated in a second operating mode. The first control device in the first operating mode and the second control device in the second operating mode conduct (uninterrupted) communication with each other. In addition, the second control device in the second operating mode undertakes (uninterrupted) communication with at least one further communications unit situated on the communications bus. Examples of the at least one further communications unit and the instances of communication listed here are already mentioned above.

A further method step S2 is carried out with the aid of the second control device (preferably regularly), in order to ascertain if its communication with the first control device and/or its communication with the at least one further communications unit has been interrupted in the meantime. In this manner, in response to a loss of its communication with the first control device in spite of its regular communication with the at least one further communications unit, the second control device detects at least one instance of functional impairment of the first control device and/or of the first motorized device. For example, in response to a loss of its communication with the first control device in spite of its regular communication with the at least one further communications unit, the second control device executes a predetermined bypass program.

In addition, as an optional method step S3, if the first control device in the first operating mode conducts (uninterrupted) communication with the at least one further communications unit, then, in response to a loss of its communication with the second control device in spite of its regular communication with the at least one further communications unit, at least one instance of functional impairment of the second control device and/or of the second motorized device may be detected. In response to a loss of its communication with second control device 14 in spite of its regular communication with the at least one further communications unit 16, first control device 12 may also execute a (further) predetermined bypass program.

Consequently, execution of the method described here also produces the advantages mentioned above.

Figure 3:
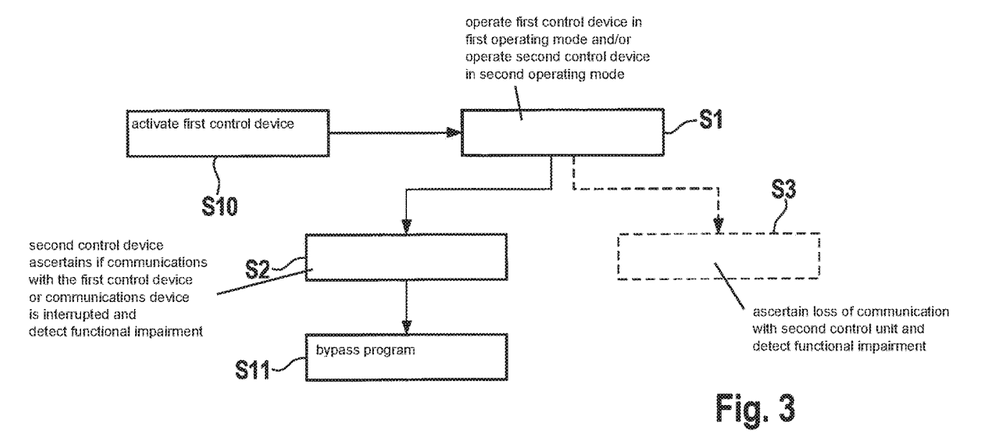
FIG. 3 shows a flow chart for explaining a specific embodiment of the method for operating a hydraulic brake system of a vehicle.

FIG. 3 shows a flow chart for explaining a specific embodiment of the method for operating a hydraulic brake system of a vehicle.

The method described here includes at least method steps S1 and S2, with the aid of which the communications system of the hydraulic brake system is checked; the first motorized device being used for controlling an electromechanical brake booster of the hydraulic brake system (in the form of the first motorized device), in such a manner, that with the aid of the controlled electromechanical brake booster, brake fluid is transferred from a master brake cylinder of the hydraulic brake system, situated downstream from the electromechanical brake booster, into at least one wheel brake cylinder of the hydraulic brake system. In addition, the second motorized device is used for controlling at least one motorized hydraulic device of the hydraulic brake system (as the second motorized device) in such a manner, that with the aid of the controlled, motorized hydraulic device, brake fluid is transferred into the at least one wheel brake cylinder.

As long as the first control device and the electromechanical brake booster are operational, then, in a method step S10, the first control device is activated to control the electromechanical brake booster in view of a provided setpoint brake pressure build-up signal regarding an instance of autonomous braking requested by an automatic speed control system of the vehicle, an instance of externally powered braking requested by a driver of the vehicle, or braking force assistance requested by the driver, in such a manner, that with the aid of the controlled electromechanical brake booster, a volume of brake fluid corresponding to the setpoint brake pressure buildup signal is transferred from the master brake cylinder into the at least one wheel brake cylinder.

However, in method step S2, if a loss of its communication with the first control device in spite of its regular communication with the at least one further communications unit is detected by the second control device, this initiates a method step S11 in the form of a bypass program, in which the second control device controls the motorized hydraulic device in such a manner, that with the aid of the controlled, motorized hydraulic device, the volume of brake fluid corresponding to the setpoint brake pressure buildup signal is transferred into the at least one wheel brake cylinder. Therefore, the reliably detected instance of functional impairment (and/or the failure) of the first control device and/or of the electromechanical brake booster may be overcome/compensated for effectively.

An ability to implement the methods described above is not limited to either a particular type of hydraulic brake system, or a particular type of vehicle/motor vehicle.

What is claimed is:

1. A communications system for a hydraulic brake system, comprising:
    a communications bus;
    a first control device connected to the communications bus; and
    a second control device connected to the communications bus;
    wherein the first control device is configured in such a way that as long as the first control device and/or a first motorized device controlled using the first control device are operational, the first control device is in a first operating mode, and, the second control device is configured in such a way that as long as the second control device and/or a second motorized device controlled using the second control device are operational, the second control device is in a second operating mode; and
    wherein the first control device in the first operating mode and the second control device in the second operating mode are configured for regular communication with each other, and the second control device in the second operating mode being configured for regular communication with at least one further communications unit situated on the communications bus in such a manner that, in response to a loss of the second control device's communication with the first control device in spite of the second control device's regular communication with the at least one further communications unit, the second control unit is configured to detect at least one instance of a functional impairment of the first control device and/or of the first motorized device.

2. The communications system as recited in claim 1, wherein the first control device in the first operating mode is configured for regular communication with the at least one further communications unit in such a manner that, in response to a loss of the first control device's communication with the second control device in spite of the first control device's regular communication with the at least one further communications unit, the first control unit is configured to detect at least one instance of functional impairment of the second control device and/or of the second motorized device.

3. The communications system as recited in claim 2, wherein in response to the loss of the first control device's communication with the second control device in spite of the first control device's regular communication with the at least one further communications unit, the first control device is configured to execute a further predetermined bypass program.

4. The communications system as recited in claim 2, wherein:
the first control unit is configured to detect the at least one instance of the functional impairment of the second control device and/or of the second motorized device when the communication bus is operational, and
the first control unit is configured to detect a functional impairment of the communication bus in response to the loss of the first control unit's communication with the second control device, if the first control unit's communication with the at least one further communication unit is likewise lost.

5. The communications system as recited in claim 1, wherein in response to the loss of the second control device's communication with the first control device in spite of the second control device's regular communication with the at least one further communications unit, the second control device is configured to execute a predetermined bypass program.

6. The communications system as recited in claim 1, wherein:
the second control unit is configured to detect the at least one instance of the functional impairment of the first control device and/or of the first motorized device when the communication bus is operational, and
the second control unit is configured to detect a functional impairment of the communication bus in response to the loss of the second control unit's communication with the first control device, if the second control unit's communication with the at least one further communication unit is likewise lost.

7. A hydraulic brake system for a vehicle, comprising:
a communications system including a communications bus, a first control device connected to the communications bus, and a second control device connected to the communications bus, wherein the first control device is configured in such a way that as long as the first control device and/or a first motorized device controlled using the first control device are operational, the first control device is in a first operating mode, and, the second control device is configured in such a way that as long as the second control device and/or a second motorized device controlled using the second control device are operational, the second control device is in a second operating mode, and wherein the first control device in the first operating mode and the second control device in the second operating mode are configured for regular communication with each other, and the second control device in the second operating mode being configured for regular communication with at least one further communications unit situated on the communications bus in such a manner that, in response to a loss of the second control device's communication with the first control device in spite of the second control device's regular communication with the at least one further communications unit, the second control unit is configured to detect at least one instance of a functional impairment of the first control device and/or of the first motorized device;
an electromechanical brake booster which is the first motorized device, the electromechanical brake booster configured to be controlled by the first control device in such a manner, that brake fluid is transferred by the controlled electromechanical brake booster from a master brake cylinder of the hydraulic brake system, situated downstream from the electromechanical brake booster, into at least one wheel brake cylinder of the hydraulic brake system; and
a motorized hydraulic device which is the second motorized device, the motorized hydraulic device configured to be controlled by the second control device in such a manner, that using the motorized hydraulic device, brake fluid is transferred into the at least one wheel brake cylinder.

8. The hydraulic brake system as recited in claim 7, wherein as long as at least the first control device and the electromechanical brake booster are operational, the first control device is configured to control the electromechanical brake booster in view of a provided setpoint brake pressure buildup signal regarding an instance of autonomous braking requested by an automatic speed control system of the vehicle, an instance of externally powered braking requested by a driver of the vehicle, or braking force assistance requested by the driver, in such a manner, that with using the controlled electromechanical brake booster, a volume of brake fluid corresponding to the setpoint brake pressure buildup signal is transferred from the master brake cylinder into the at least one wheel brake cylinder, and the second control device is configured to control the motorized hydraulic device as a bypass in such a manner, that using the controlled, motorized hydraulic device, the volume of brake fluid corresponding to the setpoint brake pressure buildup signal is transferred into the at least one wheel brake cylinder.

9. The hydraulic brake system as recited in claim 7, wherein in response to the loss of the second control device's communication with the first control device in spite of the second control device's regular communication with the at least one further communications unit, the second control device is configured to execute a predetermined bypass program.

10. A method for checking a communications system, comprising the following steps:
operating a first control device, connected to a communications bus of the communications system, in a first operating mode when the first control device and/or a first motorized device controlled using the first control device are operational; and
operating a second control device, connected to the communications bus, in a second operating mode when the second control device and/or a second motorized device controlled using the second control device are operational;
the first control device in the first operating mode and the second control device in the second operating mode carrying on communication with each other, and the second control device in the second operating mode carrying on communication with at least one further communications unit situated on the communications bus;
in response to a loss of the second control device's communication with the first control device in spite of the second control device's regular communication with the at least one further communications unit, the second control device detecting at least one instance of functional impairment of the first control device and/or of the first motorized device.

11. The method as recited in claim 10, wherein the first control device in the first operating mode carries out communication with the at least one further communications unit, and in response to a loss of the first control device's communication with the second control device in spite of the first control device's regular communication with the at least one further communications unit, the first control unit detecting at least one instance of functional impairment of the second control device and/or of the second motorized device.

12. The method as recited in claim 11, wherein in response to a loss of the first control device's communication with the second control device in spite of the first control device's regular communication with the at least one further communications unit, the first control device executing a further predetermined bypass program.

13. The method as recited in claim 11, wherein:
the first control unit is configured to detect the at least one instance of the functional impairment of the second control device and/or of the second motorized device when the communication bus is operational, and
the first control unit is configured to detect a functional impairment of the communication bus in response to the loss of the first control unit's communication with the second control device, if the first control unit's communication with the at least one further communication unit is likewise lost.

14. The method as recited in claim 10, wherein in response to a loss of the second control device's communication with the first control device in spite of the second control device's regular communication with the at least one further communications unit, the second control device is configured to execute a predetermined bypass program.

15. The method as recited in claim 10, wherein:
the first control device is configured to control an electromechanical brake booster of a hydraulic brake system, the electromechanical brake booster being the first motorized device, and wherein, using the controlled electromechanical brake booster, brake fluid is transferred from a master brake cylinder of the hydraulic brake system, situated downstream from the electromechanical brake booster, into at least one wheel brake cylinder of the hydraulic brake system; and
wherein the second control device is configured to control at least one motorized hydraulic device of the hydraulic brake system, the motorized hydraulic device being the second motorized device, and wherein, using the controlled motorized hydraulic device, brake fluid is transferred into the at least one wheel brake cylinder.

16. The method as recited in claim 15, wherein as long as at least the first control device and the electromechanical brake booster are operational, the first control device is activated, in view of a provided setpoint brake pressure buildup signal regarding an instance of autonomous braking requested by an automatic speed control system of the vehicle, an instance of externally powered braking requested by a driver of the vehicle, or braking force assistance requested by the driver, to control the electromechanical brake booster in such a manner, that using the controlled electromechanical brake booster, a volume of brake fluid corresponding to the setpoint brake pressure buildup signal is transferred from the master brake cylinder into the at least one wheel brake cylinder, and wherein, the second control device in the form of a bypass program, controls the motorized hydraulic device in such a manner, that using the controlled motorized hydraulic device, the volume of brake fluid corresponding to the setpoint brake pressure buildup signal is transferred into the at least one wheel brake cylinder.

17. The method as recited in claim 10, wherein:
the second control unit is configured to detect the at least one instance of the functional impairment of the first control device and/or of the first motorized device when the communication bus is operational, and
the second control unit is configured to detect a functional impairment of the communication bus in response to the loss of the second control unit's communication with the first control device, if the second control unit's communication with the at least one further communication unit is likewise lost.

* * * * *